US012762099B2

(12) United States Patent
Shabi et al.

(10) Patent No.: US 12,762,099 B2
(45) Date of Patent: Oct. 13, 2026

(54) DATA STORAGE SYSTEM WITH AUTOMATED CORRECTION OF REFERENCE COUNTS IN ADDRESSING STRUCTURE TO AVOID CAPACITY LEAKAGE

(71) Applicant: Dell Products L.P., Round Rock, TX (US)

(72) Inventors: Uri Shabi, Tel Mond (IL); Vladimir Shveidel, Pardes Hana-Karkur (IL); Jonathan Volij, Meitar (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/403,997

(22) Filed: Jan. 4, 2024

(65) Prior Publication Data

US 2025/0225111 A1 Jul. 10, 2025

(51) Int. Cl.
*G06F 16/215* (2019.01)

(52) U.S. Cl.
CPC .................................. *G06F 16/215* (2019.01)

(58) Field of Classification Search
CPC ............. G06F 12/0253; G06F 12/0261; G06F 3/0608; G06F 2212/1044; G06F 12/0276; G06F 3/0641; G06F 3/0604; G06F 11/1453; G06F 16/1774; G06F 11/076
See application file for complete search history.

(56) References Cited

U.S. PATENT DOCUMENTS 7,093,101 B2 8/2006 Aasheim et al.
10,852,974 B2 12/2020 Kucherov et al.
2006/0059326 A1* 3/2006 Aasheim ............. G06F 12/0246 711/E12.008
2013/0036278 A1* 2/2013 Strzelczak ............ G06F 3/0683 711/E12.001
2020/0012430 A1* 1/2020 Kucherov ............. G06F 3/0683
2021/0034292 A1* 2/2021 Vankamamidi ....... G06F 3/0604
2022/0083422 A1* 3/2022 Curtis-Maury ..... G06F 11/1435
2022/0114100 A1* 4/2022 David ................. G06F 12/0815
2023/0035832 A1* 2/2023 Wei ..................... G06F 16/2365
2024/0273080 A1* 8/2024 Dragojevic ......... G06F 16/2329

FOREIGN PATENT DOCUMENTS

DE 3853093 T2 * 7/1995

* cited by examiner

*Primary Examiner* — Khanh B Pham
*Assistant Examiner* — Kweku William Halm
(74) *Attorney, Agent, or Firm* — BainwoodHuang

(57) ABSTRACT

A method in a data storage system includes foreground processes that produce incorrect-high reference counts greater than corresponding numbers of actual references to associated data instances (e.g., virtual large blocks), representing loss of storage capacity. A background process corrects a reference count for a data instance by (1) copying the data instance to a new data instance with an initial reference count of zero and making the new data instance unavailable for reclaiming, (2) scanning a set of referencing structures for all references to the data instance, and for each reference (i) replacing the reference with a new reference to the new data instance, and (ii) incrementing the reference count of the new data instance, and (3) upon completing the scanning, making the new data instance available for eventual reclaiming based on its reference count reaching zero. The process restores reference count accuracy and reduces loss/leakage of storage capacity.

20 Claims, 5 Drawing Sheets

DATA STORAGE SYSTEM WITH AUTOMATED CORRECTION OF REFERENCE COUNTS IN ADDRESSING STRUCTURE TO AVOID CAPACITY LEAKAGE

BACKGROUND

The invention is related to the field of data storage systems, and in particular to data storage systems with data deduplication functionality and attendant possibility of inconsistent reference counts that can result in storage capacity loss or "leakage."

SUMMARY

A method is disclosed of operating a data storage system having data deduplication functionality including storage of unique data instances with associated reference counts each indicating a respective number of distinct references to the associated data instance, and having reclamation functionality that reclaims storage for reuse based on reference counts of associated data instances reaching zero.

The method includes performing one or more foreground processes in a manner that produces incorrect-high reference counts greater than corresponding numbers of actual references to associated data instances, the incorrect-high reference counts resulting in loss of storage capacity by non-reclamation of data instances when their number of actual references has reached zero and their reference counts are non-zero. Examples of such processes are given and include both erroneous cases as well as intentional cases in which a storage leak is tolerated in exchange for more performant processing.

The method further includes performing a background process of correcting the reference counts by, for each of the unique data instances, (1) copying the unique data instance to a new data instance with an initial reference count of zero and making the new data instance unavailable for reclaiming, (2) scanning a set of referencing structures for all references to the unique data instance, and for each reference (i) replacing the reference with a new reference to the new data instance, and (ii) incrementing the reference count of the new data instance, and (3) upon completing the scanning, making the new data instance available for eventual reclaiming based on its reference count reaching zero.

By performing the background process in a regular manner across a set of data instances (e.g., all data units of a set of logical volumes, or even the entire set of data units of a system), the extent of reference count mismatches is reduced and thus capacity loss is reduced accordingly. When a data instance is no longer referenced and is thus reclaimable, its reference count will be zero rather than some incorrect non-zero value, so a reclamation process will recognize the data instance as available and recycle it for another use.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
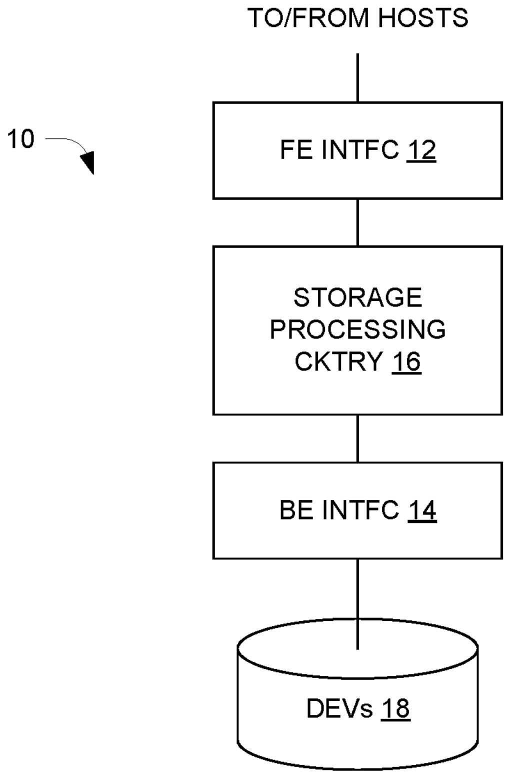
FIG. 1 is a block diagram of a data storage system from a hardware perspective.

A modern data storage system may employ log-structured writing techniques and implement so-called "deduplication," i.e., replacing all but one identical copy of a unique data instance with references to a single stored copy, reducing media usage accordingly. Such a storage device may have at least two different mapping layers: a first layer maps from volume logical address to some Virtual layer object (VLB) and may be implemented by a tree structure (e.g., Top/Mid/Leaf structures) for example, while a second layer maps from Virtual (VLB) to physical data location (PLB). Deduplication is implemented on the Virtual layer. A reference count is maintained inside each Virtual (VLB) pointer and used to reflect the number of references from the first mapping level (i.e., from Leafs).

Such a storage device uses a certain set of background processes to keep the system healthy. As an example, Garbage collection (GC) is a process that merges multiple physical blocks into fewer blocks, in the process producing more fully utilized blocks as well as fully free blocks available for reuse. In parallel to such physical block defragmentation, the virtual layer may also be defragmented to optimize and reduce resources (similar to physical layer, some become fully used and others fully freed, so overall storage efficiency is improved). At the virtual layer, a logical entry is pointing to a virtual entry, and thus in garbage collection a virtual entry is moved from one place to another, and it is necessary to fix logical pointers and update in a manner that removes old pointers and virtual entries.

In one example, a process referred to as Leaf Fixer is used to fix logical (leaf) pointers of a new virtual space, which not only fixes but in parallel guarantees that after a certain point all previous (old) pointers are gone, and it is safe to remove old references. Leaf fixer as a process may have the following attributes:

- Runs in cycles
- Has a working set of virtual entries whose pointers are to be fixed
- Traverses an entire relevant metadata space
- Fixes all pointers for given working set
- Guarantees that no old pointers are left, so it is safe to remove reference to old virtual in working sets
- Works while regular user load is ongoing and logical entries are being copied/split/removed, etc.

As mentioned above, the reference count (Ref-count) is a counter on a virtual entry that represents the number of logical pointers pointing to the virtual entry, which may be used to reclaim a virtual entry once all references are overwritten and its value becomes zero.

In some embodiments, the ref-count value is limited by some reasonable max value (which may be defined by the size of ref-count field). If the real number of references exceeds the max possible value, one of two approaches may be applied:

1. Stop referencing to this Virtual pointer, and create another new Virtual Pointer instance for further deduplication/references
2. Use predefined "infinite_ref-count" value in such cases. If this is used, then once it is reached it cannot be reliably decremented, because any additional references cannot be tracked and thus the actual number becomes unknown. Practically, such a Virtual entry represents a capacity leak, because even if all actual references are removed, the virtual entry will be kept due to the infinite indication.

A data storage system may employ any of several performance-optimizing techniques that can cause a mismatch between a reference count and the corresponding number of actual references for a given virtual entry. Examples include updating a reference count without acquiring exclusive lock for the Virtual object, making "blind" VLB updates, etc. Because there can be a tradeoff between reference count accuracy and performance of such operations, some data storage systems tolerate some amount of capacity leak for the sake of performance.

Other cases of leak may happen when logical reference and ref-count update are decoupled (i.e., not done transactionally) and only ref-count is updated and reference is not (e.g., an intervening reboot). Without a proper rollback, a leak (ref-count>references) will happen, and a virtual entry will never be reclaimed. Again, a system may prefer some limited capacity leakage to the use of a complex roll-back process.

Another cause of reference count inaccuracy can be errors such as due to incorrect programming. In this case the impact may be not just capacity leak, but also real data loss (if the ref-count becomes smaller than the actual number of references).

Considering all the above, the ability to fix ref-count values with reasonable processing cost would be very valuable.

Thus, disclosed herein is a method based on additional functionality of a Leaf Fixer process to recalculate reference counts and guarantee 1:1 correlation with the actual number of references, at little cost in terms of additional processing. The technique can provide benefits including:

1. Reduce number of data loss cases
2. Eliminate/reduce capacity leak
3. Enable use of performance-optimized techniques (e.g., that cause infinite_ref_count) without inducing capacity leak Virtual redirection is a process that moves virtual blocks from one place to another. During this move, all data from the originating (source) block is moved to the destination, and the source is freed for fresh usage. To enable access to the old pointers position, some basic information may be maintained that hints where to find the data (e.g., block pointer and offset). This process is deterministic in that it assumes the reference count is accurate and moves it to the destination, but if it is not accurate and more or less references are moved then resources may be stranded (leak).

Thus, in a disclosed technique the strict assumption is eased by refraining from copying the reference count to the destination, and rather enabling it to be recreated as part of the leaf-fix process which can ensure accuracy. As each logical reference to the old virtual entry is changed to a new reference to the new entry, the reference count is incremented. When leaf-fix is complete for a given virtual entry, it is assured that the reference count is valid and in correlation to the number of actual references.

More specifically, during leaf-fix when an existing virtual block is being replaced by a new virtual block, the following actions are taken:

1. Zero ref-count on the destination
2. Indicate that the update for this virtual block is still in progress and avoid reclamation (even though its ref-count==0 thus reclaimable), we will refer this as 'in fix' indication
3. Add the source and destination virtual address to the future leaf fix work set
4. During leaf fix process-on every fix of a logical pointer from source to destination-increment ref-count
5. Once leaf fix process is done, remove in-fix indication The process has the following aspects:

1. Virtual will not reclaim till leaf fix guarantee complete process thus at that point we know ref-count equals to actual references
2. At this point ref-count is either >0 or ==0. In case it is zero, it can be reclaimed, if not it will remain as normal virtual in the system
3. If virtual had infinite ref-count, after leaf fix it may remain infinite or reduce to a value that represent exact number of references, in such a case the leak is avoided
4. If virtual ref-count is not in agreement with actual references, this process will make them even, this will solve leak (ref-count>reference) or corruption (ref-count<

REFERENCES

It is noted that the leaf-fix process is a background process performed while other normal operations continue, including operations that may affect the number of references to an in-progress virtual block. When an existing data block is deallocated or moved, a "decrement reference count" (Decref) operation is performed to decrement the number of references. If this occurs during the leaf-fix process, it reduces ref-count but avoids reclaim due to the in-fix indication, even if the reference count should reach zero at any point during the process. A Decref can be handled in the following manner:

1. In case decrement is to the source virtual the decrement request is ignored, because it indicates an overwrite/deletion of a logical pointer that is in the process of being fixed anyway
2. In case decrement is to the destination virtual-decrement the ref-count as usual If a majority of VLBs go through GC and Leaf Fixer with some desired regularity most of the infinite ref counts or incorrect-high reference counts (i.e., those that are below max allowed value) are periodically fixed, keeping the system in a healthier state.

Note that in addition to the above-described fixing as part of moving VLBs, there could be a process of specifically identifying VLBs with infinite ref counts and adding them to the Leaf Fix working set so that they can be corrected in the same way (setting count to zero then scanning for all actual references, and incrementing count accordingly). This enables an option to fix infinite reference counts even for very cold data.

Additionally or alternatively, another option would be to add all VLBs to Leaf Fixer working set (e.g., some portion per Leaf Fixer cycle), either periodically or "on demand" based on monitoring and detecting an extent of reference count corruption.

Embodiments

FIG. 1 shows a data storage system 10 that provides secondary storage of data for host computers (hosts). It includes a front-end interface (FE INTFC) 12, back-end interface (BE INTFC) 14, storage processing circuitry 16, and a collection of data storage devices (e.g., Flash memory, magnetic disk drives, etc.) shown as DEVs 18. The front-end interface 12 and back-end interface 14 provide connections to storage-oriented interconnects to the hosts and drive storage 18 respectively, such as iSCSI, FibreChannel, etc. The storage processing circuitry 16 is specialized computer processing circuitry including memory, processors, and high-speed interconnect as generally known in the art. The processors execute specialized data storage software the implements a variety of storage functionalities, also as generally known in the art. The present description is focused on certain functionality at a mapping layer of operation including the automated correction of data block reference counts in a deduplication environment, to reduce "leakage" of data storage capacity and improve system efficiency accordingly.

Figure 2:
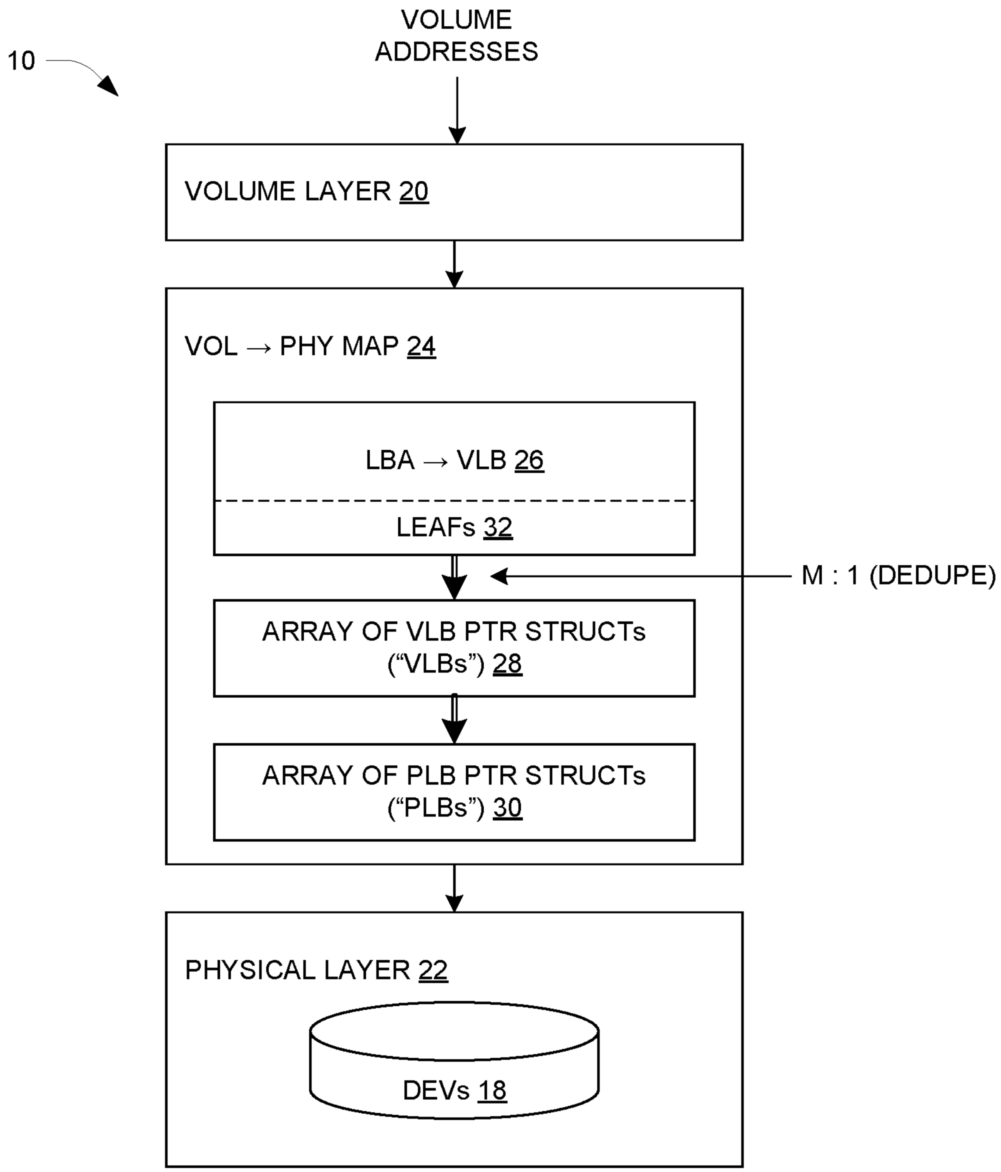
FIG. 2 is a schematic block diagram of a functional organization of the data storage system.

FIG. 2 is a functional block diagram of logical/functional components of the data storage system 10, which are realized by the execution of corresponding computer program instructions by the storage processing circuitry 16 (FIG. 1). Major functional blocks include a volume layer 20, physical layer 22, and a volume-to-physical mapping layer (VOL→PHY MAP) 24. The volume layer 20 presents a logical-volume or virtual-volume view to the hosts, based on internal volume representations of logical/virtual units of storage. The volume layer 20 accesses underlying physical storage (provided by physical layer 22) starting with an identifier of a volume and an address such as a logical block address (LBA).

The volume-to-physical mapping layer 24 is responsible for translating the LBA from the volume layer 20 to a corresponding physical-layer address for the underlying physical storage in the physical layer 22. To this end, it includes an LBA-to-VLB mapping structure (LBA→VLB MAP) 26, an array of VLB pointer structures (VLB PTR STRUCTS) 28, and an array of PLB pointer structures (PLB PTR STRUCTS) 30. The LBA-to-VLB mapping structure 26 is a multi-layer, tree-organized mapping structure, whose lowest-level components are shown as leafs 32. The terms VLB and PLB refer to "virtual large block" and "physical large block" respectively, as explained further below. For ease of description, the VLB pointer structures 28 and PLB pointer structures 30 are also referred to herein as simply VLBs and PLBs, respectively, notwithstanding that these terms are more generally understood as referring to the data objects themselves rather than their pointers. However, this usage herein is consistent with usage in the data storage art.

One important aspect of the data storage system 10 is its support for so-called "deduplication" (dedupe) functionality, which is a data reduction technique based on identifying identical copies of data blocks and replacing all but one copy with a pointer to a single stored instance of unique data. In the storage system 10, deduplication is supported in part by the indirection provided by the VLBs 28, including the ability for multiple leafs 32 to refer to a single VLB 28. This is indicated in FIG. 2 as "M:1 (DEDUPE)", wherein "M:1" indicates an arbitrary number M of references to a single VLB 28, resulting from deduplication operation. As deduplication per se is generally known, it is not elaborated further herein. The present description is focused on certain operations performed in a deduplication environment having the M:1 referencing of VLBs 28, as described below.

Figure 3A:
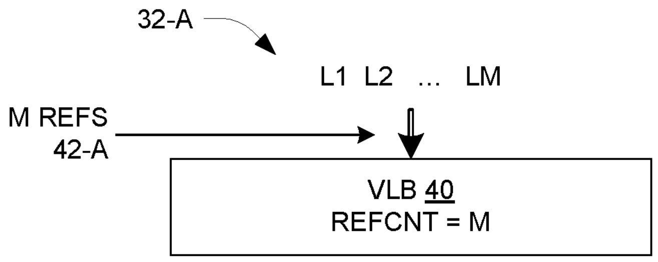
FIGS. 3A, 3B and 3C show a progression of values of a virtual large block (VLB) illustrating a problem of inaccurate reference count and corresponding storage capacity loss by inability to reclaim a VLB.
Figure 3B:
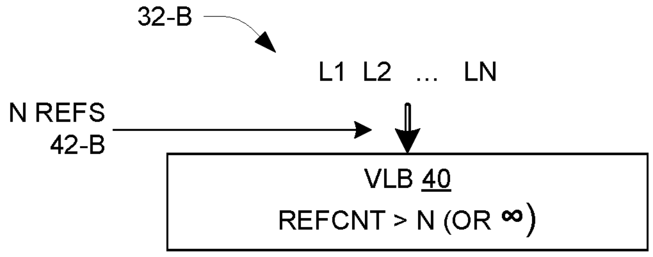
Figure 3C:
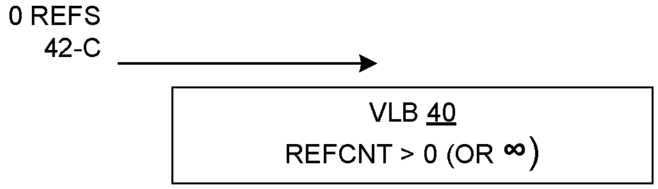

FIGS. 3A-3C illustrate a certain problem that can occur during operation of data storage systems that employ VLB-type redirection and reference counts in their logical-to-physical mapping structures and operations. FIG. 3A shows a VLB 40 at an initial time in which its reference count (REFCNT) is a value M that is equal to the number M of actual references 42-A to this VLB. The set of referencing leafs 32-A is shown as L1, L2, . . . , LM. It will be appreciated that this is the designed—for and desired operating condition, i.e., the reference count of a VLB 40 always accurately reflecting the actual number of references to that VLB 40. However, for various reasons as generally discussed above, it is possible that the reference count of a VLB 40 does not accurately reflect the actual number of references, such as shown in FIGS. 3B and 3C and discussed below. For safety reasons, the system is designed so that the reference count can only be incorrect-high, i.e., larger than the number of actual references. If it were otherwise, then the reference count could reach zero while there are still one or more valid references to a VLB, which could result in data loss by the VLB being reclaimed for another use (based on the zero reference count) and corresponding data corruption.

FIG. 3B shows the VLB 40 later when its reference count no longer accurately reflects the actual number N of references 42-B, shown at 32-B as L1, L2, . . . , LN. The reference count may be some number larger than N, or in some embodiments it may have reached a maximum value shown as oo. It will be appreciated that once a reference count reaches œ it must be treated as no longer accurate, and data safety dictates that the VLB 40 cannot be reclaimed because the number of valid references to it is unknown. Either way, the situation of FIG. 3B results when either (a) actual references are removed without decrementing the reference count, perhaps due to failure of a lock or other atomicity mechanism, or (b) the reference count is incremented without addition of a corresponding additional reference, examples of which are mentioned above.

FIG. 3C shows the VLB later when the number of actual references 42-C has reached zero, for example when all the associated logical data has been deleted or relocated. However, because of the inaccurate reference count (either >0 or ∞), the VLB 40 appears to still be in use and thus cannot be reclaimed for another use. This is the mechanism of so-called "capacity leakage," i.e., the loss of storage capacity due to the inability to delete storage units that are no longer actually in use. As explained above, this leakage can occur for a variety of reasons and may even be knowingly induced as a by-product of other operations, perhaps in a performance-for-capacity tradeoff. However, for a variety of reasons it is desirable to address the problem of capacity leakage due to reference counts mismatches, to improve overall storage system efficiency.

Figure 4:
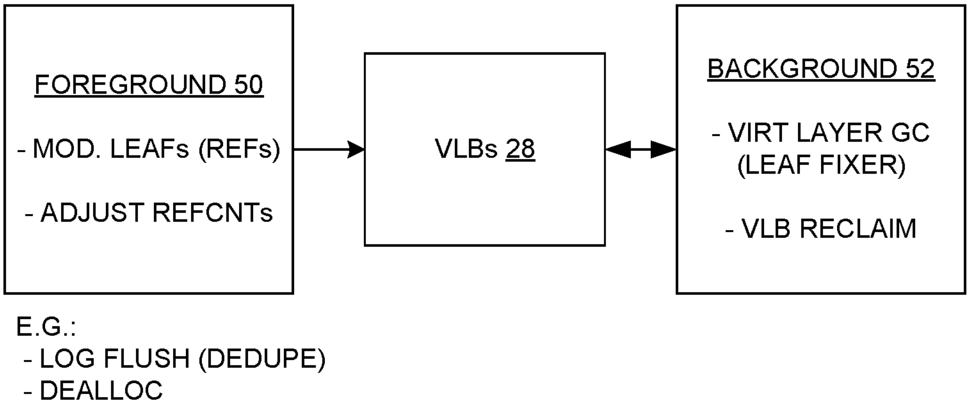
FIG. 4 is a general functional diagram of foreground and background operations on the VLBs.

FIG. 4 is another functional representation of relevant operations of the data storage system 10 in relation to the VLBs 28. One or more processes shown as foreground process 50 that modify the leafs 32 (and thus the actual references (REFs)) in some manner and adjust the reference counts (REFCNTs) of the VLBs 28. General examples of such process include a log flush operation (with deduplication) and deallocations (deletion of logical blocks of storage). As explained above, the foreground processes 50 are performed in some manner that produces incorrect-high reference counts which are greater than the numbers of actual references to the associated VLBs 28, which by itself would result in capacity leakage. The data storage system 10 also performs one or more background processes 52 that also affect the VLBs 28, including virtual-layer garbage collection (GC), also referred to as a "leaf fixer", along with virtual-layer reclamation (VLB reclaim) that recycles out-of-use VLBs into new uses. As described more below, the leaf fixer process is used in a manner that automatically corrects reference counts to accurately reflect the actual number of references, thereby reducing the capacity leakage problem as illustrated in FIGS. 3A-3C and described above.

Figure 5:
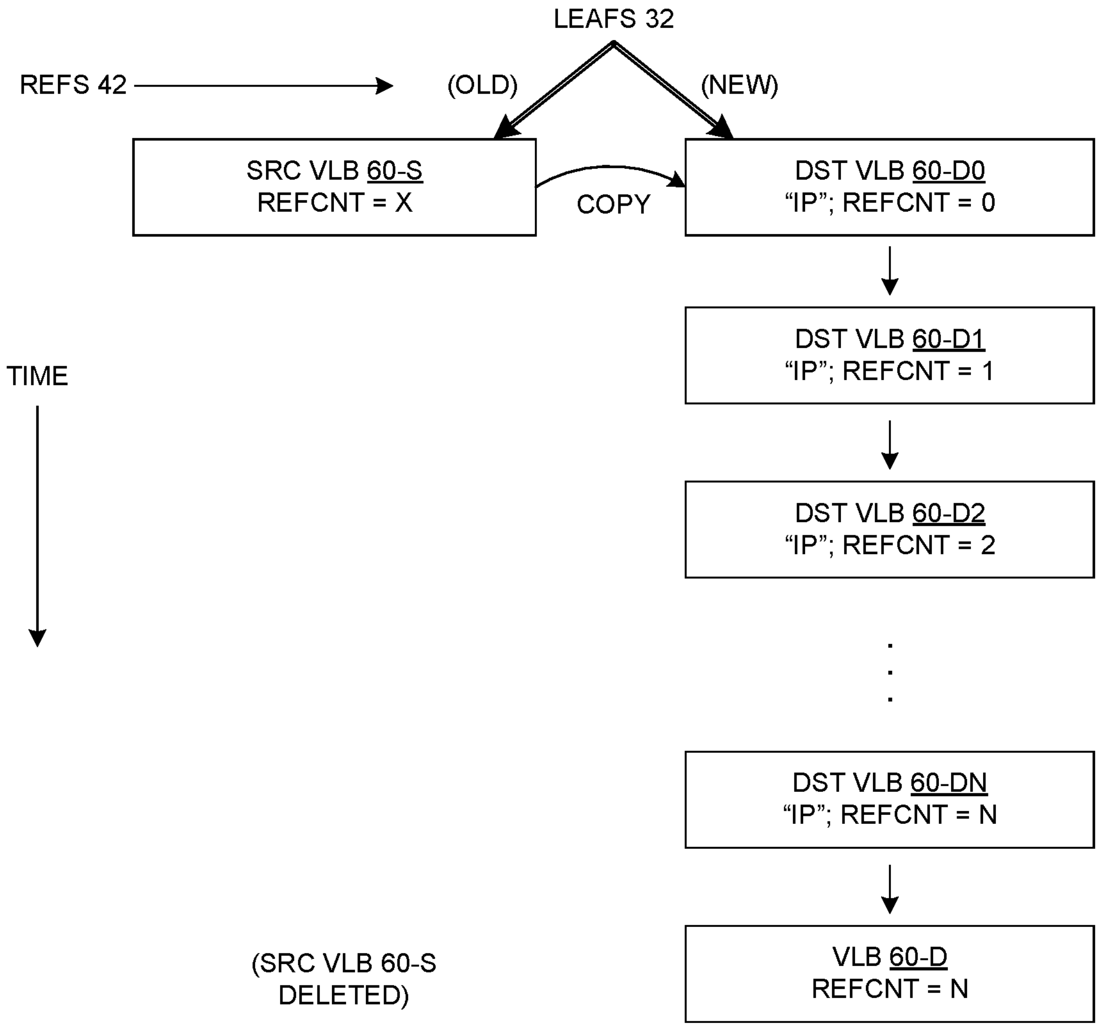
FIG. 5 illustrates leaf fixer operation that inherently produces correct reference counts for new VLBs created from old VLBs as part of garbage collection.

FIG. 5 illustrates pertinent operation of the leaf fixer with respect to an individual VLB shown as source (SRC) VLB 60-S having an initial reference count of X, which may be inaccurate (either incorrect-high or ∞, as explained above). It is assumed that there are some set of existing references 42 from the leafs 32 to the source VLB 60-S, shown as OLD. Time flows downward in FIG. 5.

First the source VLB 60-S is copied to a new VLB shown as destination (DST) VLB 60-D, whose initial value is shown as 60-D0. The reference count is not copied over, but rather the reference count of the destination VLB 60-D0 is set to zero. Also, an "in progress" (IP) flag is set to signal that that the destination VLB 60-D is being operated on by the leaf fixer and thus is not a candidate for reclaiming.

The leaf fixer then proceeds to scan the leafs 32 of the LBA-to-VLB mapping structure 26 for all actual references to the source VLB 60-S, and replace each of these with a new reference to the destination VLB 60-D. For each reference it finds, it also increments the reference count. This is shown as a succession of VLB values 60-D1, 60-D2, . . . , 60-DN. During this time, the IP flag remains set. Once all leafs 32 have been scanned, all actual references will have been replaced and the reference count will accurately reflect the actual number of references, irrespective of whether the reference count X of the source 60-S was correct or not. The source VLB 60-S is removed, and the destination VLB 60-D is used exclusively going forward. Thus, this process inherently reduces capacity leakage by automatically correcting VLB reference counts as part of the leaf fixer process, which itself is a component of virtual-layer GC.

Figure 6:
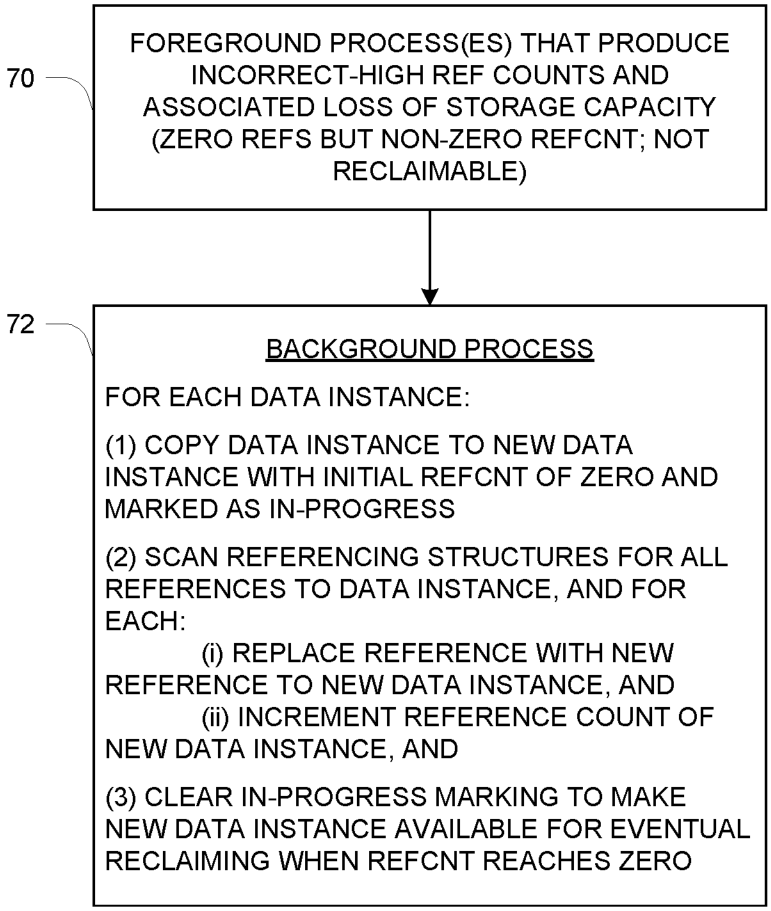
FIG. 6 is a flow diagram of operation including a background process that produces corrected reference counts.

FIG. 6 is a flow diagram of high-level operation as relates to the automatic correction of VLB reference counts as described above. The technique is performed in a data storage system having data deduplication functionality that storage of unique data instances with associated reference counts each indicating a respective number of distinct references to the associated data instance, as well as having reclamation functionality that reclaims storage for reuse based on reference counts of associated data instances reaching zero.

At 70, one or more foreground processes are performed in a manner that produces incorrect-high reference counts greater than corresponding numbers of actual references to associated data instances (e.g., VLBs 28), where the incorrect-high reference counts result in loss of storage capacity by non-reclamation of data instances when their number of actual references has reached zero and their reference counts are non-zero. As noted above, in some embodiments a reference count may also reach a maximum value that also becomes incorrect if the number of actual references is permitted to exceed this number.

At 72, a background process is performed of correcting the reference counts by, for each of the unique data instances, (1) copying the unique data instance to a new data instance with an initial reference count of zero and marked as in-progress to prevent reclaiming of the new data instance (e.g., initial value of destination VLB 60-D0, FIG. 5), (2) scanning a set of referencing structures (e.g., leafs 32) for all references to the unique data instance, and for each reference (i) replacing the reference with a new reference to the new data instance, and (ii) incrementing the reference count of the new data instance, and (3) upon completing the scanning, clearing the in-progress marking to make the new data instance available for eventual reclaiming based on its reference count reaching zero (e.g., series of values 60-D1, 60-D2, . . . , 60-DN in FIG. 5).

While various embodiments of the invention have been particularly shown and described, it will be understood by those skilled in the art that various changes in form and details may be made therein without departing from the scope of the invention as defined by the appended claims.

What is claimed is:

1. A method of operating a data storage system having data deduplication functionality including storage of unique data instances with associated reference counts each indicating a respective number of distinct references to the associated data instance, the storage system also having reclamation functionality that reclaims storage for reuse based on reference counts of associated data instances reaching zero, comprising:

performing one or more foreground processes in a manner that produces incorrect-high reference counts greater than corresponding numbers of actual references to associated data instances, the incorrect-high reference counts resulting in loss of storage capacity by non-reclamation of data instances when their number of actual references has reached zero and their reference counts are non-zero; and performing a background process of correcting the reference counts by, for each of the unique data instances, (1) copying the unique data instance to a new data instance with an initial reference count of zero and making the new data instance unavailable for reclaiming, (2) scanning a set of referencing structures for all references to the unique data instance, and for each reference (i) replacing the reference with a new reference to the new data instance, and (ii) incrementing the reference count of the new data instance, and (3) upon completing the scanning, making the new data instance available for eventual reclaiming based on its reference count reaching zero;

wherein replacing the reference with the new reference includes replacing a pointer to data of the unique data instance with a new pointer to the same data in the new data instance as part of a garbage collecting background process;

wherein each of the unique data instances includes a respective associated existing reference count resulting from the foreground processes, the existing reference count having a non-zero value, and wherein the copying of each the unique data instances to a respective new data instance refrains from copying the existing reference count and instead creates a new reference count with the initial reference count of zero, for use in the subsequent steps 2 (i) and 2 (ii) for the new data instance; and wherein making the new data instance unavailable for reclaiming includes setting an indication that indicates to a reclamation service that the new data instance is unavailable for reclaiming, including while the new data instance has the initial reference count of zero.

2. The method of claim 1, wherein making the new data instance unavailable for reclaiming includes marking the new data instance as in-progress, and wherein making the new data instance available for eventual reclaiming includes clearing the in-progress marking.

3. The method of claim 1, wherein the referencing structures are included in a mapper structure organized and operative to map logical block addresses to physical block addresses.

4. The method of claim 3, wherein the mapper structure has a multi-layer organization including a tree-organized first layer including the referencing structures and a second layer having metadata of the data instances, the metadata including the reference counts.

5. The method of claim 4, wherein the referencing structures are leaf structures forming a lowest sub-layer of the tree-organized first layer, the leaf structures having a generally M:1 relationship to the data instances to effect the data deduplication functionality.

6. The method of claim 5, wherein the background process is a leaf fixer process being configured and operative to:

(i) be executed in regular cycles and concurrently with regular user load that is dynamically modifying the references contained in the set of referencing structures;

(ii) employ a working set of data instances whose references are to be fixed, and fix all references in the working set;

(iii) traverse an entire relevant metadata space; and (iv) guarantee that all references have been updated and thereby enable safe removal of old data instances.

7. The method of claim 4, wherein the second layer includes virtual large blocks (VLBs) storing the reference counts and having pointers to respective physical large blocks (PLBs) providing underlying physical storage of the data instances.

8. The method of claim 1, wherein performing one or more foreground processes in a manner that produces incorrect-high reference counts includes one or more of (1) a performance optimization that intentionally trades performance for reduced capacity by refraining from updating a reference count, (2) decoupled, non-transactional updating of the references and the reference counts, and (3) errors including incorrect programming.

9. The method of claim 8, wherein the performance optimization includes a blind update of a reference count.

10. The method of claim 8, wherein the non-transactional updating includes updating a reference count without acquiring an exclusive lock for the data instance.

11. A data storage system having storage processing circuitry and physical storage media, the storage processing circuitry executing computer program instructions to cause the data storage system to provide secondary data storage services to host computers including data deduplication functionality and reclamation functionality, the deduplication functionality including storage of unique data instances with associated reference counts each indicating a respective number of distinct references to the associated data instance, the reclamation functionality reclaiming storage for reuse based on reference counts of associated data instances reaching zero, the data storage services further including:

performing one or more foreground processes in a manner that produces incorrect-high reference counts greater than corresponding numbers of actual references to associated data instances, the incorrect-high reference counts resulting in loss of storage capacity by non-reclamation of data instances when their number of actual references has reached zero and their reference counts are non-zero; and performing a background process of correcting the reference counts by, for each of the unique data instances, (1) copying the unique data instance to a new data instance with an initial reference count of zero and making the new data instance unavailable for reclaiming, (2) scanning a set of referencing structures for all references to the unique data instance, and for each reference (i) replacing the reference with a new reference to the new data instance, and (ii) incrementing the reference count of the new data instance, and (3) upon completing the scanning, making the new data instance available for eventual reclaiming based on its reference count reaching zero;

wherein replacing the reference with the new reference includes replacing a pointer to data of the unique data instance with a new pointer to the same data in the new data instance as part of a garbage collecting background process;

wherein each of the unique data instances includes a respective associated existing reference count resulting from the foreground processes, the existing reference count having a non-zero value, and wherein the copying of each the unique data instances to a respective new data instance refrains from copying the existing reference count and instead creates a new reference count with the initial reference count of zero, for use in the subsequent steps 2 (i) and 2 (ii) for the new data instance; and wherein making the new data instance unavailable for reclaiming includes setting an indication that indicates to a reclamation service that the new data instance is unavailable for reclaiming, including while the new data instance has the initial reference count of zero.

12. The data storage system of claim 11, wherein making the new data instance unavailable for reclaiming includes marking the new data instance as in-progress, and wherein making the new data instance available for eventual reclaiming includes clearing the in-progress marking.

13. The data storage system of claim 11, wherein the referencing structures are included in a mapper structure organized and operative to map logical block addresses to physical block addresses.

14. The data storage system of claim 13, wherein the mapper structure has a multi-layer organization including a tree-organized first layer including the referencing structures and a second layer having metadata of the data instances, the metadata including the reference counts.

15. The data storage system of claim 14, wherein the referencing structures are leaf structures forming a lowest sub-layer of the tree-organized first layer, the leaf structures having a generally M:1 relationship to the data instances to effect the data deduplication functionality.

16. The data storage system of claim 15, wherein the background process is a leaf fixer process being configured and operative to:

(i) be executed in regular cycles and concurrently with regular user load that is dynamically modifying the references contained in the set of referencing structures;

(ii) employ a working set of data instances whose references are to be fixed, and fix all references in the working set;

(iii) traverse an entire relevant metadata space; and (iv) guarantee that all references have been updated and thereby enable safe removal of old data instances.

17. The data storage system of claim 14, wherein the second layer includes virtual large blocks (VLBs) storing the reference counts and having pointers to respective physical large blocks (PLBs) providing underlying physical storage of the data instances.

18. The data storage system of claim 11, wherein performing one or more foreground processes in a manner that produces incorrect-high reference counts includes one or more of (1) a performance optimization that intentionally trades performance for reduced capacity by refraining from updating a reference count, (2) decoupled, non-transactional updating of the references and the reference counts, and (3) errors including incorrect programming.

19. The data storage system of claim 18, wherein the performance optimization includes a blind update of a reference count, and wherein the non-transactional updating includes updating a reference count without acquiring an exclusive lock for the data instance.

20. The method of claim 1, wherein the new data instance has the initial reference count of zero after the unique data instance is copied to the new data instance.

* * * * *